United States Patent [19]

Wiegand et al.

[11] Patent Number: 4,499,861
[45] Date of Patent: Feb. 19, 1985

[54] METHOD AND APPARATUS FOR THE INJECTION OF ALCOHOL FUELS, MORE PARTICULARLY FOR DIRECT INJECTION DIESEL ENGINES

[75] Inventors: Herbert Wiegand, Cologne; Klaus Bäumer, Bonn, both of Fed. Rep. of Germany

[73] Assignee: Deutsche Forschungs- und Versuchsanstalt fur Luft- und Raumfahrt e.V., Cologne, Fed. Rep. of Germany

[21] Appl. No.: 551,264

[22] Filed: Nov. 14, 1983

[30] Foreign Application Priority Data

Nov. 23, 1982 [DE] Fed. Rep. of Germany ....... 3243175

[51] Int. Cl.³ ...................... F02B 75/12; F02B 23/06
[52] U.S. Cl. .................................. 123/1 A; 123/299; 123/304; 123/305; 123/576; 239/533.12
[58] Field of Search ............... 123/300, 304, 299, 1 A, 123/276, 576, 578; 239/533.2–533.11, 66

[56] References Cited

U.S. PATENT DOCUMENTS

| 4,370,958 | 2/1983 | Pischinger et al. | 123/276 |
| 4,399,786 | 8/1983 | Holmer | 123/276 |
| 4,401,071 | 8/1983 | Zürner | 123/276 |

FOREIGN PATENT DOCUMENTS

| 2325822 | 12/1973 | Fed. Rep. of Germany | 239/533.5 |
| 1209212 | 2/1960 | France | 239/533.3 |
| 535151 | 3/1941 | United Kingdom | 123/299 |
| 537825 | 7/1941 | United Kingdom | 239/533.3 |
| 549419 | 11/1942 | United Kingdom | 239/533.5 |

Primary Examiner—E. Rollins Cross
Attorney, Agent, or Firm—Spensley, Horn, Jubas & Lubitz

[57] ABSTRACT

According to the method in the two-fuel system, using diesel and alcohol fuel, the alcohol fuel is continuously supplied with a fuel pump and the diesel fuel is discontinuously supplied with an injection pump by way of separate lines of an injection apparatus. An apparatus, which is suitable for carrying out the method, has a nozzle body (10) with the fluid-controlled needle valves (17; 18a; 18b) which are operated after the opening pressure $p_o$, which is adjusted at the pressure springs (19; 20a; 20b), is reached by the diesel fuel conveyed through the ring conduit (12) and the pressure channels (13; 14a; 14b), in which case the opening pressure $p_o$ for the needle valve (17) is constantly adjusted to a lower value in respect of the satellite needle valves (18a; 18b). After the needle valve (17) has opened, the diesel fuel, which is under high pressure, flows through the spray apertures (24a; 24b), from which the alcohol fuel, which is conveyed by way of the ring channel (27) and the inlet channels (28a; 28b), is entrained by the diesel fuel according to the Venturi-ejector principle and a two-fuel mixture develops in the spray apertures (24a; 24b). The apparatus can also be equipped with suction slots (31a; 31b) which open out in the narrowest cross section of the spray apertures (24a; 24b) so that by sucking in air out of the combustion chamber (25) a two-fuel two-phase flow develops there.

18 Claims, 4 Drawing Figures

NEEDLE VALVE (18b) } ALCOHOL FUEL
NEEDLE VALVE (18a)

NEEDLE VALVE (17) DIESEL FUEL

METHOD AND APPARATUS FOR THE INJECTION OF ALCOHOL FUELS, MORE PARTICULARLY FOR DIRECT INJECTION DIESEL ENGINES

BACKGROUND OF THE INVENTION

1. Field of the Invention

The invention relates to a method and an apparatus for the injection of alcohol fuels (ethanol, methanol), more particularly for direct injection diesel engines, so that the alcohol fuels having poor spontaneous ignition qualities may be processed in engines without spark ignition.

2. Description of the Prior Art

When alternative alcohol fuels are used in direct injection diesel engines, it is necessary to raise the temperature in the combustion chamber of a direct injection diesel engine with a fuel having spontaneous ignition qualities (diesel fuel) during the injection phase of the alcohol fuel having poor spontaneous ignition qualities to such an extent that the spontaneous ignition temperature of the latter is reached.

It is known that special measures must be taken for the purpose of processing alcohol fuels having poor spontaneous ignition qualities in engines without spark ignition. This can be achieved, on the one hand, by lowering the temperature necessary for spontaneous ignition by admixing an ignition accelerator, such as, for example, kerobrisol or amyl nitrate. On the other hand, this can be achieved by measures taken in respect of the engine, that is, by raising the temperature level towards the end of the compression cycle to a level above the temperature of spontaneous ignition.

As follows from the polytropic equation for the temperature increase during compression, the temperature of the charge at the end of the compression cycle is essentially dependent upon the temperature at the time when the inlet valve is closed and upon the height of the compression ratio. In addition to raising the compression ratio, it is therefore important to effect an increase in the temperature of the intake air. The latter can either take place by heating the intake air or by mixing the same with hot exhaust gases which can either be taken from a separate burner or simply from the exhaust gas line of the engine.

In most diesel engines a comparatively large quantity of ignitable mixture will already be present on account of the long ignition lag at the time of ignition and this will result in combustion in sudden bursts having all the negative effects upon the driving apparatus and the noise radiation. The M process of MAN avoids this problem with wall addition of the fuel, guaranteeing that as soon as combustion starts only small quantities of fuel are processed and that further combustion proceeds in a controlled manner with the aid of an air vortex. At any rate it has hereby been shown that the start and warming up in the pure alcohol operation could only be achieved with the aid of a starting aid based on a starting pilot plant, for example. If, before the engine is switched off, in each case there is a switch over to diesel fuel, the later start can be realized in the pure diesel fuel operation. The injection equipment differs from that of the conventional multifuel engine because of the pump element which is enlarged on account of the lower thermal value.

The suction pipe injection of methanol, the diesel fuel-methanol-emulsion method and the direct injection of methanol have been investigated as further methods of forming a mixture for the purpose of operating direct injection diesel engines with alcohol fuels. In the case of suction pipe injection methanol is admixed with the air taken in in the suction pipe. The diesel fuel injected in a conventional manner takes over the ignition. As a result of various problems—for example, spark failures may result in the partial charge range of this method, so that the methanol constituent in this operating range has to be greatly reduced—it is possible, but only to a limited extent, to substitute diesel fuel for methanol by using suction pipe injection according to the present level of development. Similar problems also arose in the case of the emulsion method in which a mixture of diesel fuel and methanol was used instead of diesel fuel. As still to this day no method for preparing a stable mixture of diesel fuel and methanol is known, an emulsion must be produced in the fuel system by constant, intensive, mechanical mixing. As a result of the high level of vaporization heat the emulsified methanol has a detrimental effect upon the ignition lag of the diesel fuel and in the partial charge range increased HC and CO emissions result and even spark failures can occur.

SUMMARY OF THE INVENTION

Direct injection of methanol in combination with a diesel fuel ignition ray, the so-called ignition-ray process, offers better scope here. The tests with direct injection of methanol were carried out for two different methods of direct injection. These are combustion processes which are known in practice and which are called the D and Z processes.

The mixture formation is assisted in both combustion processes by an air swirl produced in the intake channel. The D process operates with injection taking place close to the wall into a deep trough, whereby in conjunction with a great detail of air spin there results a considerable amount of stratification of charge in the form of a mixture ring. In two-fuel operation the methanol is injected close to the wall with the two-hole nozzle usually used for pure diesel operation. For the purpose of starting the combustion a diesel fuel ignition ray is introduced into the combustion chamber by means of an additional one-hole nozzle. The direction of the ignition ray is chosen so that the diesel fuel ignition ray serves as a reliable igniter for the methanol-air mixture throughout the entire speed range. In the case of the Z process the fuel in the series-type diesel operation is sprayed into an open, shallow combustion chamber trough through a four-hole nozzle, which is arranged in the centre, in a spatially distributed manner. In two-fuel operation with methanol good ignition is achieved with the aid of a diesel fuel-injection nozzle which sprays diagonally through the combustion chamber and whose jet is comparatively long and free.

The underlying object of the invention is to inject the diesel fuel having ignition qualities and the alcohol fuel having poor ignition qualities into the combustion chamber in the case of direct injection diesel engines for alcohol fuels with the aid of an injection apparatus in such a way that by means of the diesel fuel, which has ignition qualities and whose start of injection must be before the start of injection of the alcohol fuel in terms of time, the temperature level in the combustion chamber is raised towards the end of the compression cycle to a level above the spontaneous ignition temperature of the alcohol fuel and/or with the aid of the diesel fuel a situation is reached where combustion commences and there is reliable ignition through the whole operating range of the engine.

This object is achieved according to the invention in the two fuel system using diesel and alcohol fuel by continuously supplying the alcohol fuel with a fuel pump for alcohol fuels, for example, and by discontinuously supplying the diesel fuel with an injection pump of the known construction-type by way of separate lines of the injection apparatus. When the needle valve is open the diesel fuel flows in a known way through the spray apertures, in whose narrowest cross section alcohol fuel is taken in by way of a suction channel according to the Venturi-ejector principle. In order to avoid a situation where the alcohol fuel, which is conveyed under low pressure with a fuel pump, depending upon the working cycle of the engine continuously reaches the combustion chamber or is passed back to the fuel pump and where this would result in the destruction of the latter, satellite needle valves, which are controlled by the diesel fuel, lie in the suction channels for the alcohol fuel, which channels may be constructed as blind holes. By means of the nozzle needles, which are pressed onto the valve seat with great, adjustable pretension, the opening pressure $p_o$ can be preset in such a way that within certain limits opening and closing times varying in terms of time for the fluid-controlled needle valves can be adjusted, whereby the needle valve for the diesel fuel, which takes in the alcohol fuel through the ejector effect by way of a suction channel in the narrowest cross section of a spray aperture, must open, according to the invention, in terms of time before the satellite needle valves for the alcohol fuel and must close afterwards in terms of time so that it is guaranteed that at the beginning and at the end of the injection process the proportion of diesel fuel having more ignition qualities in the combustion chamber is great in respect of the alcohol fuel having poor ignition qualities.

DESCRIPTION OF THE PREFERRED EMBODIMENT

Figure 1:
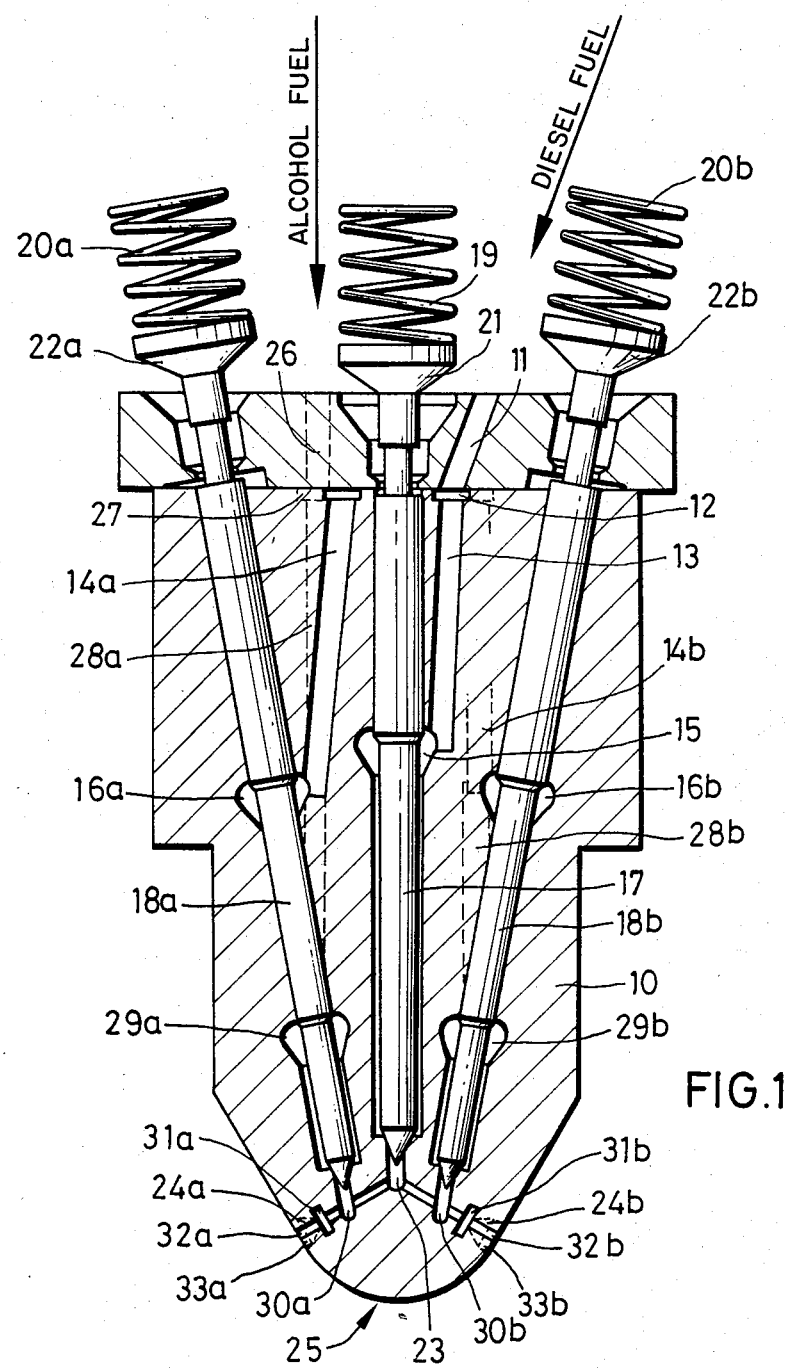
FIG. 1 is a longitudinal section of a body of a nozzle made according to the present invention.

An exemplary embodiment of the invention is presented in the drawing and is described in the following in greater detail. FIG. 1 shows a longitudinal section of the body of the nozzle 10 having a pressure channel 11 for diesel fuel which by way of a ring channel 12 directs the diesel fuel by way of the pressure channels 13 and 14a; 14b to the pressure chambers 15 and 16a; 16b so that when the opening pressure $p_o$, which can be adjusted for the fluid-controlled needle valve 17 and the satellite needle valves 18a; 18b, being separate from each other, at the pressure springs 19 and 20a; 20b by way of the pressure adjusting disks 21 and 22a; 22b, is reached, the needle valve 17 and the satellite needle valves 18a; 18b can be operated within certain limits, independently of each other in terms of time. The pressure channel 13 leads from the pressure chamber 15 further as far as the blind hole 23 from which the diesel fuel can enter into the combustion chamber 25 through the spray apertures 24a; 24b when the needle valve 17 is open. The pressure channels 14a; 14b end in the pressure chambers 16a; 16b so that the diesel fuel entering into these pressure channels only serves to control the satellite needle valves 18a; 18b for the alcohol fuel.

The alcohol fuel, which is conveyed with a fuel pump, is fed through the inlet channel 26 to a ring conduit 27, from which the alcohol fuel reaches the collecting chambers 29a; 29b by way of the inlet channels 28a; 28b and is sucked in, when the needle valve 17 is open and the satellite needle valves 18a; 18b are open, through the ejector effect of the diesel fuel, which is under high pressure, by way of the suction channels 30a; 30b, which end in the narrowest cross section of the spray apertures 24a; 24b and which are constructed as blind holes. The fit of the satellite needle valves 18a; 18b in the body of the nozzle 10 between the pressure chambers 16a; 16b and the collecting chambers 29a; 29b corresponds to the usual fit for fluid-controlled needle valves. As, according to the invention, the control of the satellite needle valves 18a; 18b takes place by means of the diesel fuel conveyed by an injection pump, the diesel fuel has an essentially higher level of pressure than the alcohol fuel conveyed by a simple fuel pump so that the direction of flow of the seepage goes from the pressure chambers 16a; 16b to the collecting chambers 29a; 29b. By means of the suction slots 31a; 31b a situation is reached where air is sucked in from the combustion chamber 25 in the narrowest cross section of the spray apertures 24a; 24b, so that with diesel and alcohol fuel a two-phase flow of these fuels, which enter into the combustion chamber 25 by way of the spray apertures 24a; 24b, develops. In order to achieve optimum flow conditions in the spray apertures 24a; 24b, a diffuser-type extension 32a; 32b having a cylindrical portion 33a; 33b can be subsequently connected to the said spray apertures 24a; 24b.

Another possibility of obtaining a mixture of air and fuel before the fuel enters the combustion chamber lies in sucking in air from the combustion chamber 25 with an ejector (not shown) and passing it back into the combustion chamber together with the fuel by way of a combining nozzle having a subsequently connected diffuser.

Figure 2:
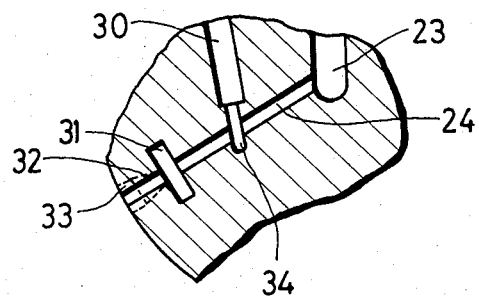
FIG. 2 is a partial sectional view of a body of a nozzle made according to the present invention, particularly showing that part of the body in the vicinity of the spray aperture.

FIG. 2 shows in section a possible case where in the narrowest cross section of a spray aperture 24 the suction channel 30, which serves as a blind hole for the satellite needle valve 18, can be advantageously coordinated to the cross section of the spray aperture 24 owing to the fact that the suction channel 30 is continued by means of a suction channel 34 which ends in a blind hole.

Figure 3:
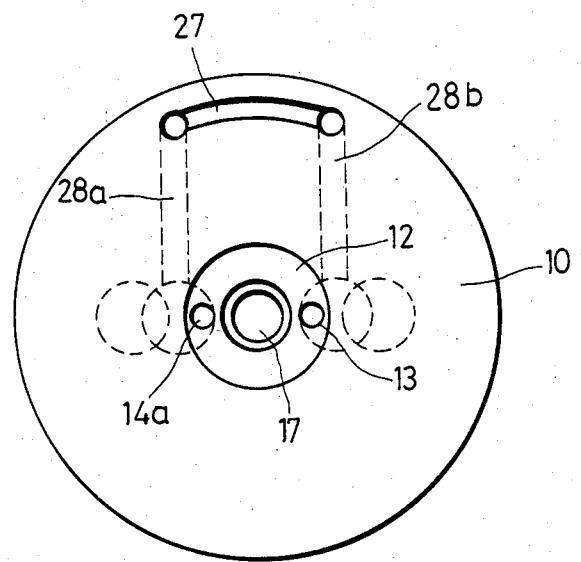
FIG. 3 is a cross-sectional view of the body of a nozzle made according to the present invention taken at the ring channel.

FIG. 3 shows in cross section the arrangement of the ring channel 12 in the body of the nozzle 10 from which the pressure channel 13 is supplied by means of the needle valve 17 by the diesel fuel and the pressure channels 14a; 14b (not shown) serve to supply diesel fuel for the purpose of operating the fluid-controlled satellite needle valves 18a; 18b (not shown) for the alcohol fuel. The ring channel 27 is supplied with alcohol fuel by way of an inlet channel 26 (not shown), into which the inlet channels 28a; 28b open out.

An injection apparatus can be constructed not only as a one-hole nozzle, but also as a multihole nozzle, in which case the number of spray apertures 24a; 24b of the multihole nozzle does not have to be limited to two. Irrespective of the number of spray apertures only one pressure channel 13, one pressure chamber 15, one needle valve 17 with pressure spring 19 and pressure adjusting disk 21 and also only one blind hole 23 are necessary for the diesel fuel. The number of pressure channels 14 having pressure chambers 16 for the control of the satellite needle valves 18 by means of the diesel fuel, of inlet channels 28 having collecting chambers 29, of satellite needle valves 18 having pressure springs 20 and pressure adjusting disks 22 and also of suction channels 30 for the alcohol fuel is determined, however, by the number of spray apertures 24.

The advantages realized with the invention lie above all in the fact that in the case of direct injection diesel engines having the injection apparatus according to the invention diesel fuel and alcohol fuel can be injected in a combustion chamber in such a way that the diesel fuel having spontaneous ignition qualities acts as an ignition aid for the alcohol fuel having poor spontaneous ignition qualities throughout the entire period of injection. In two-fuel operation the alcohol fuel is injected into the combustion chamber towards the end of the compression cycle; injection of the diesel fuel commences shortly before, that is, in such a manner that the opening pressure $p_o$ at the fluid-controlled needle valve 17 for the diesel fuel is adjusted at the pressure adjusting disk 21 to a value lower than that at the fluid-controlled satellite needle valves 18a; 18b for the alcohol fuel. In this way injection with the method according to the invention can be divided up into three phases, that is, in the first phase the diesel fuel having ignition qualities is injected into the combustion chamber as a single-fuel flow, in the second phase the diesel fuel having ignition qualities is injected into the combustion chamber together with the alcohol fuel having poor ignition qualities as a two-fuel flow and in the third phase as in the first phase the diesel fuel having ignition qualities is injected into the combustion chamber as a single-fuel flow.

Figure 4:
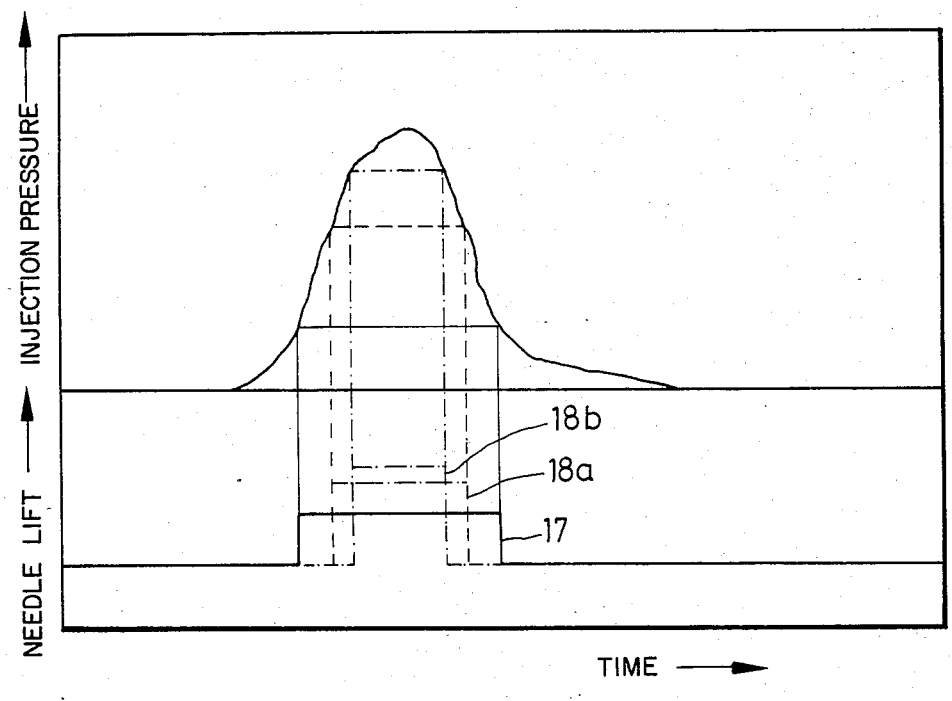
FIG. 4 is a diagram of needle lift and injection pressure as a function of time for the needle valves for diesel fuel and alcohol fuel.

In FIG. 4 the three phases of injection are diagrammatically plotted in the form of the needle lifts of the needle valve 17 for the diesel fuel and of the satellite needle valves 18a; 18b for the alcohol fuel over the injection pressure of the diesel fuel behind the injection pump.

In the case of a multihole nozzle it is also possible to control the time for the opening and closing of the satellite needle valves 18a; 18b by way of the pressure adjusting disks 22a; 22b in such a way that the alcohol fuel can be brought into the combustion chamber in a controlled manner in terms of time and space.

A further, important advantage of the method according to the invention is the fact that with direct injection of diesel and alcohol fuel as a single- and two-fuel flow the needle valve 17 and the satellite needle valves 18a; 18b are only operated by changes in pressure in the diesel fuel conveyed through an injection pump so that different times for the opening and closing of the needle valve 17 and of the satellite needle valves 18a; 18b can be adjusted exactly and can also be reproduced as they lie in a control circuit.

Furthermore, with the suction slots 31a; 31b or with an ejector attachment correspondingly in the spray apertures 24a; 24b the hardness and penetration depth of the jet can be affected in such a manner in the case of the method according to the invention that a stratification of charge develops in the combustion chamber and in the first injection phase a single-fuel two-phase flow develops, in the second injection phase a two-fuel two-phase flow develops and in the third injection phase a single-fuel two-phase flow develops again all still in the diffusers, which are subsequently connected to the spray apertures and which have a connected cylindrical portion.

A further advantage of the method for injecting alcohol fuel using the Venturi principle lies in the fact that by means of the type of operating method possible in the first injection phase the diesel fuel having ignition qualities already starts the ignition and therewith raises the temperature in the combustion chamber to or above the spontaneous ignition temperature of the alcohol fuel having poor spontaneous ignition qualities, in the second injection phase the temperature in the combustion chamber is so high that the two-fuel two-phase mixture consisting of diesel and alcohol fuel ignites gently and combustion proceeds in a continuous manner and in the third injection phase the residue of alcohol fuel is extracted from the blind holes 30a; 30b so that at the end of the injection process no more alcohol fuel having poor ignition qualities reaches the combustion chamber.

With the aid of theoretical formulations and characteristic values, which can be determined from tests, the method and the apparatus for injection alcohol fuel according to the Venturi principle can be designed in such a way that in the three defined injection phases in each case a single-fuel two-phase flow, a two-fuel two-phase flow and a single-fuel two-phase flow enter into the combustion chamber in such a manner that a stratification of charge, which is optimum in terms of time and space for conditions in respect of ignition and mixture formation, is obtained with a given size and geometry of the combustion chamber.

The alcohol fuels present difficulties in the case of high-pressure injection. More particularly, the low viscosity leads to problems in respect of wear at points which are specifically highly charged. These problems can on the whole be considered to be solved with the measures according to the invention on the pump side, as an injection pump for alcohol fuel is not present. Similarly the problems in respect of wear at points, which are specifically highly charged, as a result of the low viscosity of the alcohol fuels can be avoided as a lubricating effect is achieved by means of the diesel fuel flowing as leakage oil at these points.

We claim:

1. A method for the injection of fuel for direct injection diesel engines, said engines having an injection pump and using alternative alcohol fuels and diesel fuel, in which at the end of the compression cycle during an injection process diesel fuel and alcohol fuel are injected from a multihole nozzle, said method comprising:

in the first phase injecting the diesel fuel having ignition qualities for the purpose of starting the combustion and raising the temperature level in the cylinder room;

in the second phase injecting a two-fuel mixture consisting of diesel and alcohol fuel for the purpose of achieving gentle ignition with continuous combustion; and in the third phase injecting diesel fuel so that at the end of the injection process no more alcohol fuel having poor ignition qualities reaches the combustion chamber, and wherein the first and third phases are very short compared with the second phase.

2. A method according to claim 1 wherein a needle valve is used for injecting the diesel fuel and satellite needle valves are used for injecting the alcohol fuel, and wherein an injection pump controls both the needle valve and the satellite needle valves.

3. A method according to claim 2 wherein alcohol fuel is supplied to suction channels in said nozzle through said satellite needle valves adjacent the narrowest cross section of the spray apertures forming said multihole nozzle and wherein diesel fuel is injected into said spray apertures at high pressure, so that the alcohol fuel is sucked from the suction channels by the flow of the diesel fuel through said spray apertures.

4. A method according to claim 3 wherein the alcohol fuel is continuously conveyed to said suction channels during said second phase at low pressure.

5. A method according to claim 3 wherein the supply of alcohol fuel to said suction channels is controlled by the satellite needle valves which are in a control circuit that includes the needle valve for the diesel fuel, the opening and closing pressure of the needle valve and the satellite needle valves being adjusted so that different opening and closing times occur during the injection process for the needle valve and the satellite needle valves.

6. A method according to claim 5 wherein the opening pressure for the needle valve and for the satellite needle valves is pre-adjusted so that the first and third phases are very short compared to the second phase.

7. A method according to claim 4 wherein the hardness and penetration of the fuel jets exiting said spray apertures is regulated by means of suction slots, connected with the combustion chamber or by means of an ejector so that in the first injection phase with the diesel fuel a two-phase flow develops, in the second injection phase with diesel and alcohol fuel a two-fuel two-phase flow develops and in the third injection phase a two-phase flow develops with diesel fuel, and wherein the size of the suction slots at the individual spray apertures or the ejector is selected to obtain a stratification of charge of the single-fuel and two-fuel two-phase mixture.

8. A method according to claim 5 wherein the needle valve and the satellite needle valves are controlled by way of diesel fuel conveyed by said injection pump through a ring channel to a pressure chamber.

9. A method according to claim 8 wherein the suction channels are supplied with alcohol fuel through a ring channel, an inlet channel and a collecting chamber.

10. A nozzle according to claim 1 wherein said suction channel is the blind bore hole for the second needle valve.

11. A method according to claim 9 wherein a lubricating effect is achieved in the satellite needle valves between the pressure chamber and the collecting chamber.

12. In a nozzle for injecting fuel through a nozzle opening into the combustion chamber of a direct injection diesel engine which uses both alcohol and diesel fuel, and to which nozzle diesel fuel is supplied at high pressure by an injection pump, the improvement comprising:

a spray aperture channel for fuel flowing to said nozzle opening, said spray aperture channel having a cross section of varying size;

means for injecting diesel fuel supplied to said nozzle into said spray aperture channel;

a suction channel adjacent the portion of said spray aperture channel having the narrowest cross section; and means for controllably injecting at low pressure alcohol into said suction channel, so that diesel fuel injected into said spray aperture channel sucks alcohol from said suction channel into said spray aperture channel, said alcohol and diesel fuel flowing out of said nozzle opening into said combustion chamber.

13. A nozzle as in claim 12 wherein said means for controllably injecting alcohol comprises a needle valve through which alcohol is injected into said suction channel, said needle valve controlled by the flow of diesel fuel so as to be open only when diesel fuel is being injected into said spray aperture.

14. A nozzle as in claim 12 wherein said means for injecting diesel fuel at high pressure into said spray aperture channel includes a first needle valve through which diesel fuel in injected into said spray aperture channel and said means for controllably injecting alcohol into said suction channel includes a second needle valve through which alcohol is injected into said suction channel, said first and second needle valves controlled by said diesel fuel supplied by said injection pump, said first and second needle valves configured so that said first needle valve opens before said second needle valve opens and closes after said second needle valve closes.

15. A nozzle as in claim 14 further comprising a collecting chamber for alcohol, said collecting chamber adjacent a first portion of said second needle valve and cooperating with said suction channel.

16. A nozzle as in claim 15 further comprising a pressure chamber for diesel fuel to control said second needle valve, said pressure chamber adjacent a second portion of said second needle valve separated from said first portion, the portion of said needle valve between said pressure and collecting chambers being in close-fitting, valve action permitting relationship with said nozzle so that diesel fuel leaks from said pressure chamber to said collecting chamber to lubricate said second needle valve.

17. A method for injecting fuel into a diesel engine, said engine having an injection pump for diesel fuel and a nozzle, said nozzle having a first needle valve for controlling diesel fuel and a second needle valve for controlling alcohol fuel supplied to the combustion chamber, said method comprising:

first, injecting only diesel fuel into said combustion chamber through said first needle valve and said nozzle opening;

second, injecting a mixture consisting of diesel fuel and alcohol into said combustion chamber, said diesel fuel being injected into said combustion chamber through said first needle valve and said alcohol being supplied to said combustion chamber through said second needle valve; and third, injecting only diesel fuel into said combustion chamber through said needle valve.

18. In a method for supplying fuel at the end of a compression cycle to a diesel engine, the diesel engine using alcohol fuel and diesel fuel and being provided with a nozzle having needle valves to control the flow of diesel fuel and alcohol into the combustion chamber and an injection pump for supplying diesel fuel at high pressure to said nozzle, the improvement comprising:

controlling the needle valve for alcohol with diesel fuel so that the needle valve for alcohol is open after diesel fuel is first injected into the combustion chamber to initiate combustion and is closed while diesel fuel continues to be injected into the combustion chamber.

* * * * *